United States Patent [19]

Dunford

[11] Patent Number: 5,154,294
[45] Date of Patent: Oct. 13, 1992

[54] VIDEOCASSETTE TRAY

[75] Inventor: Wyman Dunford, Westlake Village, Calif.

[73] Assignee: Technicolor Videocassette Inc., Livonia, Mich.

[21] Appl. No.: 757,479

[22] Filed: Sep. 10, 1991

[51] Int. Cl.⁵ .............................................. B65D 21/04
[52] U.S. Cl. ..................................... 206/503; 206/387; 206/564; 206/507; 206/519
[58] Field of Search ............... 206/505, 506, 507, 518, 206/519, 520, 387, 557, 564; 220/23.6

[56] References Cited

U.S. PATENT DOCUMENTS

| | | | |
|---|---|---|---|
| 4,164,309 | 8/1979 | Staats | 206/387 |
| 4,207,979 | 6/1980 | Brown | 206/564 |
| 4,238,032 | 12/1980 | Thurman . | |
| 4,307,809 | 12/1981 | Haswell | 206/387 |
| 4,375,848 | 3/1983 | Simpson et al. | 206/507 |
| 4,522,301 | 6/1985 | Ajmera | 206/507 |
| 4,550,837 | 11/1985 | Simmons | 220/23.6 |
| 4,589,549 | 5/1986 | Hehn | 206/387 |
| 4,821,882 | 4/1989 | Messina | 206/387 |
| 4,832,208 | 5/1989 | Finnegan . | |
| 4,972,951 | 11/1990 | Vartanian | 206/387 |
| 5,000,526 | 3/1991 | Comerford | 206/387 |
| 5,062,526 | 11/1991 | Rudnick et al. | 206/564 |

Primary Examiner—Stephen Marcus
Assistant Examiner—S. Castellano
Attorney, Agent, or Firm—Lyon & Lyon

[57] ABSTRACT

A videocassette overlay tray comprised of a sturdy plastic composition which is inexpensive and improves sorting and storage functions of videocassettes in the duplication and manufacturing environment. The videocassette tray permits the storage of a large number of videocassettes before or after the duplication process, and the walls and recesses of the overlay tray are constructed so that the trays may be stacked one upon another in interfitting relationship with the tray fully retaining and protecting the videocassettes placed in fixed positions within the tray below. The trays are further constructed whereby each recess helps form a support apex, thus allowing a tray when full to be stacked one on top of another while resting on a storage platform or cart, and also is capable of being nested when empty in one of two possible nesting configurations.

9 Claims, 2 Drawing Sheets

VIDEOCASSETTE TRAY

BACKGROUND OF THE INVENTION

1. Field of the Present Invention

This invention generally relates to storage trays and to an overlay tray for grouping, sorting and storing videocassettes. More particularly, this invention relates to a stackable videocassette tray.

2. Description of the Prior Art

A videocassette generally takes the form of a standardized rectangular block incorporating a pair of symmetrically spaced tape spools upon which is wound a magnetic recording tape. Videocassettes of the VHS format are standard in dimension and weight. Multiple storage containers for VHS videocassettes have been developed in the art, however these containers have typically taken the form of bulky rigid bins comprising stacked units.

Tray structures for various products are also generally known in the prior art. Additionally, there are a number of trays developed in which similar trays could be stacked upon one another in a "use" attitude (capacity of tray being utilized) or nested within one another in a "storage" attitude (no capacity utilized). Yet, specific overlay devices or trays used to hold, store, or transport VHS or similar (e.g., Beta, 8 mm) videocassettes, in addition to being bulky, unduly large, and cumbersome, are typically not tailored, except for their size, to complement or to help maximize the videocassette manufacturing environment.

Moreover, the stackability of such overlay devices or trays is usually proportional to its sturdiness. One major problem encountered with prior overlay devices is that they contain no provision for storing or transporting a large number of videocassettes while being retained by other similar overlay devices. Furthermore, it is also highly likely that videocassettes would be inadvertently dislodged from their selected or presorted locations if the devices are moved or accidentally bumped.

In the prior art, nesting storage trays are typically prone to unique problems in the videocassette manufacturing environment which were not previously encountered by conventional storage means made primarily of steel or wood casings. In the videocassette manufacturing environment, plastic overlays that are too hard are typically brittle and unsuitable, whereby constant usage results in breakage. Plastic overlays which are too soft fail to provide stackability and sufficient rigidity for good manual handling characteristics.

SUMMARY OF THE INVENTION

The present invention seeks to lower the cost, and improve the reliability in the videocassette manufacturing environment, and thus the prior art, by utilizing a sturdy videocassette tray made from tough plastic to assist in the storing and grouping of videocassettes in a typical industrial high volume manufacturing and/or recording environment. Hence, the present invention is a simple, inexpensive, stackable plastic tray which is configured to nest when empty and further configured to be stacked and locked together when fully loaded.

One aspect of the present invention which helps accomplish this goal is the provision of trays able to hold a large number of videocassettes, such as forty-eight. Typically in the videocassette manufacturing art, videocassette recorder (VCR) racks are organized eight machines high, and the forty-eight (48) quantity provides for good organization of the cassettes (i.e., three rows of sixteen videocassettes in the videocassette tray representing six racks of VCRs at eight machines high). This is significant in organizing the product to be duplicated in even cassette groups. Generally, VCR racks are in rows and have aisle space between racks depending on the facility. During the initial duplication stage in the manufacturing process, blank videocassettes are delivered to the dub floor on carts which roll easily between the VCRs. As videocassettes are placed in the VCRs the empty trays of the present invention nest and collapse to a smaller volume. Thus, it becomes very evident when all videocassettes are in the VCRs or have been removed from the trays.

In the prior art and with typical carts, one would have to physically check several sides of the cart and also inside the trays in order to verify that the appropriate number of videocassettes have been removed. Also, the quantity of videocassettes on a standard cart would likely require a confirmation by actually counting them. Consequently, the advantages of the trays of the present invention during this stage of the manufacturing (duplicating) process are: (1) improved identification and organization of videocassettes for VCR duplication; (2) improved batch control capability during duplication; and (3) improved visual confirmation of empty or full carts carrying videocassette trays.

Additionally, the present invention provides numerous advantages in the manufacturing environment after duplication has occurred. The present invention allows for quick and efficient transfer of fully loaded videocassette trays to pallets and further allows larger pallet quantities for accumulation purposes. Furthermore, if the manufacturing environment is a multi-building operation, palletized videocassette trays can be more efficiently moved between buildings. Thus, during the post-duplication stage of the manufacturing process, the trays of the present invention are advantageous because they (1) provide quick and efficient palletization; (2) improve storage at higher density; (3) ease inter-building transfers; and (4) provide accumulation of videocassettes without deploying an additional number of moving carts or pallets. Moreover, after the palletized loads are transferred to finishing or packaging areas, the videocassette trays are unloaded until empty, nested, and then recirculated for use at the beginning of the duplication process. Thus, during the final production stage, the advantages of the present invention are: (1) good visual confirmation of videocassettes upon their arrival at the final stage; (2) protection of the videocassettes from damage during handling by lift trucks and pallet jacks; and (3) minimal spacing requirements due to nesting capability when unloaded.

An object of the present invention is to provide an improved tray for videocassettes.

It is a further object of the present invention to provide a videocassette holder, or overlay tray, which is inexpensive and yet improves sorting and storage functions. Such a videocassette tray is adapted to facilitate retaining videocassettes during storage and transportation of the tray, and also to facilitate efficient retrieval or removal of videocassettes therefrom.

Another object of the present invention to provide a sturdy videocassette tray which is capable of containing a number of videocassettes, whereby each tray is capable of being stacked when fully loaded without instability or the threat of breakage.

In accordance with a preferred embodiment of the present invention, an overlay tray made from a single shot injection mold comprising a durable and sturdy plastic composition is integrally constructed to provide a nestable tray configured to allow interlocking stacking when loaded with videocassettes. A tray of the present invention further defines a series of parallel and angularly stepped storage portions formed by one primary recess, a horizontal bottom, side walls, a peripheral wall, and an angular recess forming a bottom resting pad. The loading of each angled storage portion, starting with the front storage portion having the primary recess as its angularly stepped length, forms an angled recess, thereby completing the stepped portion of the following and adjacent storage portion.

The primary recess, horizontal bottoms, and peripheral walls separating each stepped storage portions are constructed so that, when fully loaded, trays may be stacked one upon another in an interfitting relationship. When interfitted, the bottom of one fully loaded tray is in a close relationship with the top of another fully loaded tray so that the bottom tray helps retain the top tray.

A further object of the present invention is to provide a videocassette tray with two built-in nesting options for compact nesting of empty trays in order to save or maximize space constraints; each capable of allowing the trays to be nested with similarly oriented trays in such a way that similarly spaced protrusions can be aligned with identically spaced recesses of an underlying tray. One nesting option is utilized by placing each videocassette tray in a similar videocassette tray whereby all videocassette trays are facing the same direction (i.e., the primary recesses of all videocassette trays face the same "forwardly" direction). The second nesting option is utilized by placing every videocassette tray in the opposite direction of its host tray, thus making every alternate tray face the same direction.

Accordingly, it is an object of the present invention to provide an inexpensive videocassette tray, containing therein the requisite durability and sturdiness necessary for use in the videocassette duplicating and manufacturing environment, which improves grouping, sorting, and storage functions during the videocassette manufacturing process. Other and further objects and advantages will appear hereinafter.

DESCRIPTION OF THE PREFERRED EMBODIMENT

Figure 1:
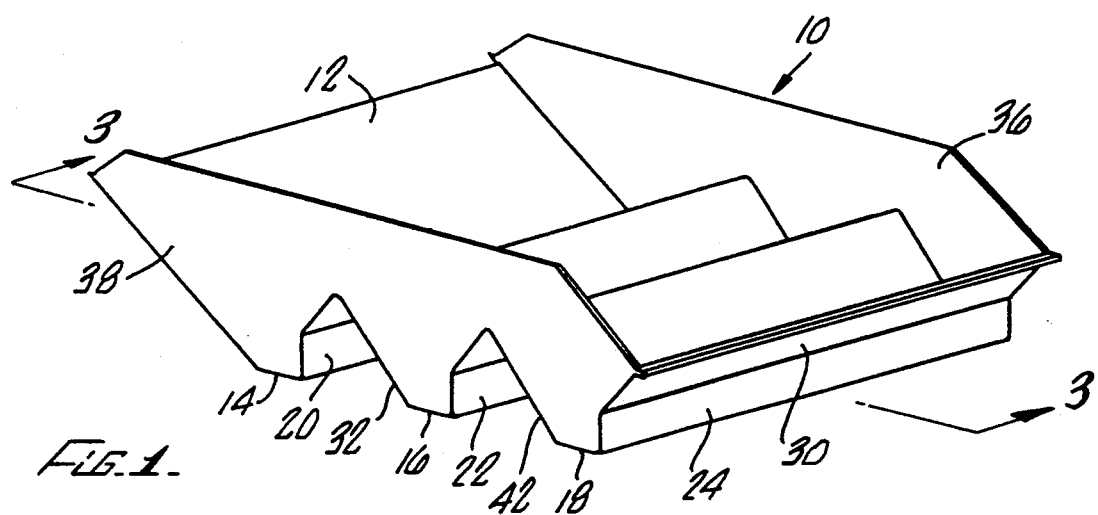
FIG. 1 is a perspective view of a videocassette tray according to the present invention.

As can be seen in reference to the drawings, the device which forms the basis of the present invention is designated generally by the reference numeral 10. Referring to FIGS. 1, 2A, 2B, 3, and 4, the videocassette tray 10 is illustrated in a primarily horizontal position, whereby the videocassette tray 10 has a bottom, front, back, and two sides, and can be formed by one of many known vacuum forming injection molding processes available in the molding art whereby all subsequent videocassette trays 10 could be similarly manufactured.

Figure 3:
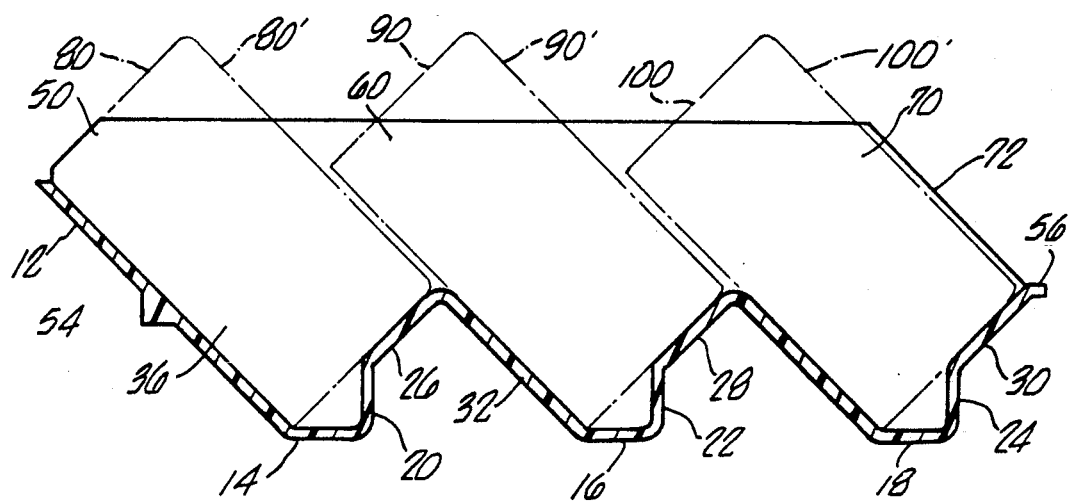
FIG. 3 is a cross-sectional view of a videocassette tray when fully loaded with videocassettes.
Figure 4:
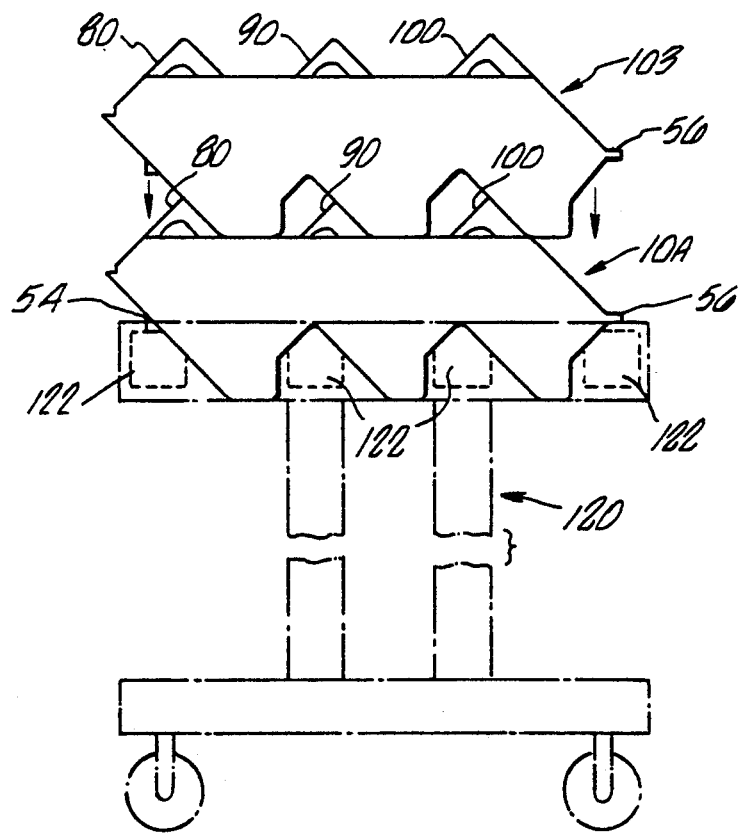
FIG. 4 is a side view of a fully loaded videocassette tray being stacked one upon another while retained in a videocassette mobile cart.

As illustrated in FIGS. 1 and 3, a videocassette tray 10 is depicted comprising a primary segment or wall 12 extending downwardly at a slope angle and intersecting with horizontal bottom or horizontal tray bottom 14. The horizontal bottom 14 is intersected perpendicularly with a peripheral wall 20 which extends upwardly away from the horizontal bottom 14 toward the top of the videocassette tray until it intersects angular recess bottom 26, whereby angular recess bottom 26, if a parallel imaginary plane were extended downwardly toward the primary segment 12, would be perpendicular to the primary segment 12. A frontal stepped storage recess 50 is formed and enclosed by longitudinal side walls 36 and 38, which extend upwardly and perpendicularly to the primary segment 12 and the horizontal bottom 14. Thus, a frontal stepped storage recess 50, as formed by the primary segment 12, the horizontal bottom 14, the peripheral wall 20, and the angular recess bottom 26, is readily capable of retaining a row of videocassettes 80 as depicted by FIGS. 3 and 4.

Referring to FIG. 3, stepped storage recesses 60 and 70 are similarly formed from corresponding horizontal bottoms 16 and 18, peripheral walls 22 and 24, and angular recess bottoms 28 and 30. The middle stepped storage recess 60 is formed by middle segment or secondary wall 32, which extends downwardly at a sloped angle parallel to primary segment 12. Middle segment 32 would also extend upwardly and parallel to the outer casing of videocassette 80 retained by the frontal stepped storage recess 60. At its downward slope, middle segment 32 intersects horizontal bottom 16, which is coplanar to horizontal bottoms 14 and 18, whereby the coplanar horizontal bottoms 14, 16 and 18 provide resting means for the entire videocassette tray 10. Horizontal bottom 16 extends horizontally and perpendicularly intersects the middle peripheral wall 22, whereby middle peripheral wall 22 extends upwardly and is parallel to peripheral walls 20 and 24. Middle angular recess bottom 28 intersects peripheral wall 22 and is parallel to angular recesses 26 and 30, and further, if a parallel imaginary plane were extended downwardly toward the middle segment 32, would be perpendicular to said middle segment 32.

Thus, a middle stepped storage recess 60 is formed by the exposed external videocassette housing 80' of videocassettes 80 and middle segment 32, horizontal bottom 16, peripheral wall 22, and angular recessed bottom 28. The rearwardly stepped storage recess 70 is similarly formed by the exposed external, videocassette housing 90 of videocassettes 90, rear segment or teritiary wall 42, horizontal bottom 18, rearward peripheral wall 24, and rear angular recess bottom 30.

The middle and rearwardly stepped storage recesses 60 and 70 following the frontal stepped storage recess 50 are formed, at least in part, by the placement of a videocassette in the corresponding forwardly abutting stepped storage recess (50 or 60). In the present embodiment, each stepped storage recess (50, 60 and 70) has the capability of retaining a row of sixteen individual videocassettes.

The frontal stepped storage recess 50 is formed on its front portion by the primary segment 12, which is forwardly sloped, thereby making the frontal stepped storage recess 50, and its corresponding stepped storage recesses 60 and 70, slanted. The longitudinal side walls 36 and 38 which retain the stepped storage recesses 50, 60 and 70 cover the majority of the surface area of the stored videocassettes (80, 90 and 100) which abut the longitudinal side walls 36 and 38 (as depicted by FIGS. 3 and 4) whereby only a top corner surface area is exposed outside of the videocassette tray 10.

The inwardly sloped rear edge 72 of the longitudinal side walls 36 and 38, and the frontal primary segment 12, create a slanting characteristic readily apparent when viewing the videocassette tray 10 from the side. Moreover, due in part by the slanting characteristics of the videocassette tray 10 which thereby advances forwardly more displaced weight contained within the tray, and further, due in part by the fact that frontal primary segment 12 solely holds in place approximately twice as much videocassette surface area than its corresponding sloped segments (middle and rearward segment 32 and 42), frontal primary segment 12 of the frontal stepped storage recess 50 is lengthwise the longest of the parallel sloped segments (12, 32, and 42).

Such a slanting arrangement aids in the stability of the videocassette tray 10 when fully loaded and stacked. Referring to FIG. 4, the videocassette tray 10 is disposed on a mobile videocassette cart 120 typically utilized in the videocassette manufacturing art, whereby the sloped segments 12, 32 and 30, and the frontal and rear support flanges 54 and 56 of the videocassette tray 10A are resting on support beams 122 of the mobile cart 120. Typically in some embodiments, the horizontal bottoms 14, 16 and 18 of the videocassette tray 10A are in primary contact with flat surfaces of some mobile carts of the videocassette manufacturing art.

Stacking is accomplished when, as an example, the primary, middle and rear segment 12, 32 and 42, and horizontal bottoms 14 and 16 of videocassette tray 10B are placed in the channels formed by the exposed external surface of the rows of videocassettes (80', 90', and 100'). Thus, when the videocassette tray 10A is fully loaded, the videocassettes retained in the bottom videocassette tray 10A help to guide and support the stacking of the next higher or upper videocassette trays 10B, and, due to the large plurality of individual videocassettes capable of being retained in each storage recess (50, 60 and 70), the weight of any contacting videocassette tray 10B is evenly distributed throughout the next lower videocassette tray 10A.

The weight of any lower videocassette tray 10A is further supported by the frontal and rear support flanges 54 and 56. When the videocassette tray 10B fully rests on a lower videocassette tray 10A, the support flange 54 comes into full contact with videocassettes 80, 90 and 100 of the lower videocassette tray 10A, thereby promoting an upward and offsetting force to help counteract downward forces applied by the upper videocassette tray 10B.

Figure 2A:
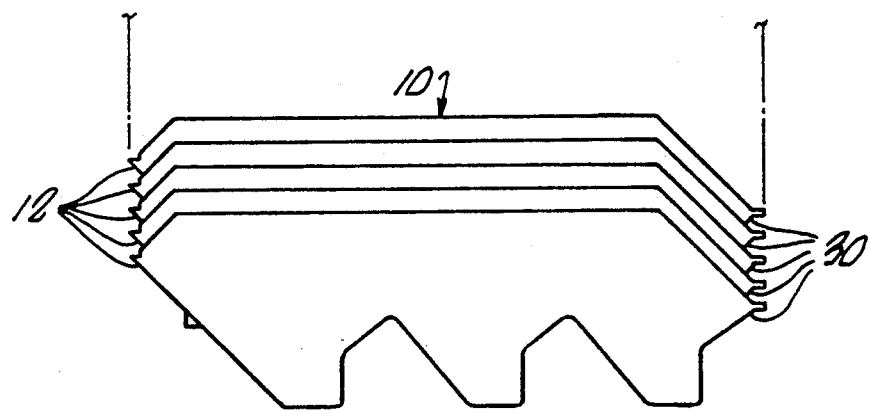
FIG. 2A is a side view depicting a plurality of videocassette trays nested within one another in the same direction according to the first nesting option of the present invention.
Figure 2B:
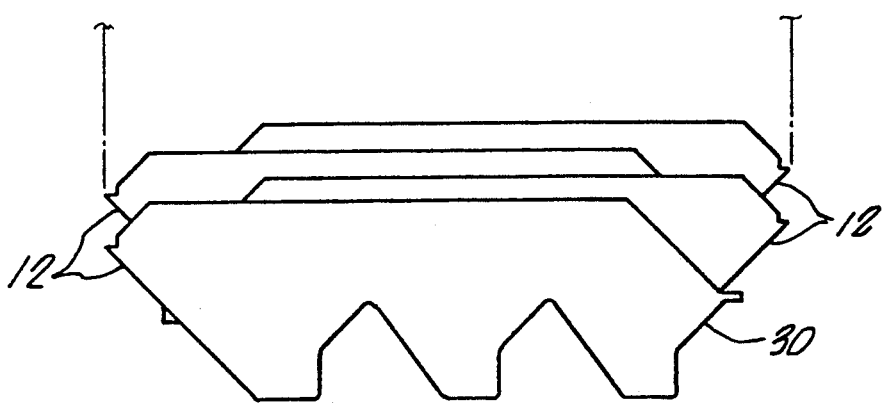
FIG. 2B is a side view depicting a plurality of videocassette trays nested within one another in an alternative manner according to the first nesting option of the present invention.

Alternative nesting options, which provide for greater storage flexibility of trays during non-use (and as depicted in FIGS. 2A and 2B) are easily determinable by the placement of the upper videocassette tray 10. If the "slant" nesting of FIG. 2A is desired, all upper videocassette trays 10 would be placed in the burdened or previously stacked videocassette tray 10 whereby all videocassette trays 10, as a totality, have their primary segments 12 each facing the same frontal direction. Also, as a totality, all videocassette trays 10 would have their rearwardly angular recess bottoms 30 facing the same direction. If the "straight" nesting of FIG. 2B is desired, each alternative videocassette tray 10 when empty is placed in the opposing direction in relation to its counterpart section of the previous videocassette tray 10.

Hence, from the foregoing, a videocassette tray is disclosed which has durability and sturdiness for use in the videocassette duplication and manufacturing environment and which further improves the grouping, sorting, and storage functions prevalent during such processes. While embodiments and applications of this invention have been shown and described, it would be apparent to those skilled in the art that many modifications are possible without departing from the inventive concepts herein.

What is claimed is:

1. A stackable videocassette tray comprising:
   a primary wall;
   a first tray bottom attached to the primary wall with the primary wall extending upwardly from the first tray bottom at an obtuse angle;
   a first peripheral wall attached substantially perpendicularly to and extending upwardly from the first tray bottom;
   a first recess bottom attached to and extending upwardly from the first peripheral wall, with the first recess bottom substantially perpendicular to the primary wall;
   a secondary wall attached substantially perpendicularly to and extending downwardly from the first recess bottom;
   a second tray bottom attached to the secondary wall with the second tray bottom substantially parallel and co-planar with the first tray bottom;
   a second peripheral wall attached substantially perpendicularly to and extending upwardly from the second tray bottom;
   a second recess bottom attached to and extending upwardly from the second peripheral wall with the second recess bottom substantially perpendicular to the secondary wall; and
   a pair of spaced apart side walls each attached to at least one of the primary and secondary walls, first and second tray bottoms, first and second peripheral walls, and first and second recess bottoms.

2. The tray of claim 1 wherein the primary wall is longer than the secondary wall.

3. The tray of claim 1 comprising a single piece molded plastic unit.

4. A stackable videocassette tray comprising:
   a primary wall;
   a first tray bottom attached to the primary wall with the primary wall extending upwardly from the first tray bottom at an obtuse angle;
   a first peripheral wall attached substantially perpendicularly to and extending upwardly from the first tray bottom;
   a first recess bottom attached to and extending upwardly from the first peripheral wall, with the first recess bottom substantially perpendicular to the primary wall;
   a secondary wall attached substantially perpendicularly to and extending downwardly from the first recess bottom;

a second tray bottom attached to the secondary wall with the second tray bottom substantially parallel and co-planar with the first tray bottom;

a second peripheral wall attached substantially perpendicularly to and extending upwardly from the second tray bottom;

a second recess bottom attached to and extending upwardly from the second peripheral wall with the second recess bottom substantially perpendicular to the secondary wall;

a tertiary wall attached substantially perpendicularly to and extending downwardly from the second recess bottom;

a third tray bottom attached to the tertiary wall, with the third tray bottom substantially parallel and co-planar with the second tray bottom;

a third peripheral wall attached substantially perpendicular to and extending upwardly from the third tray bottom;

a third recess bottom attached to and extending upwardly from the third peripheral wall, with the third recess bottom substantially perpendicular to the tertiary wall; and a pair of spaced apart side walls each attached to at least one of the primary, secondary and tertiary walls, first second and third tray bottoms, first, second and third peripheral walls, and first, second and third recess bottoms.

5. The tray of claim 4 further comprising a support flange attached to the primary wall.

6. The tray of claim 5 further comprising a support flange attached to the third recess bottom.

7. The tray of claim 6 wherein the primary wall is longer than the secondary wall and the tertiary wall.

8. The tray of claim 4 comprising a single piece molded plastic tray.

9. A stackable molded plastic videocassette tray comprising:

a primary wall;

a first tray bottom attached to the primary wall with the primary wall extending upwardly from the first tray bottom toward a first direction at an obtuse angle;

a first peripheral wall joined substantially perpendicularly to and extending upwardly from the first tray bottom toward the first direction;

a first recess bottom joined to and extending from the first peripheral wall, with the first recess bottom substantially perpendicular to the primary wall;

a secondary wall joined substantially perpendicularly to and extending downwardly from the first recess bottom, the primary wall longer than the secondary wall;

a second tray bottom joined to the secondary wall with the second tray bottom substantially parallel and co-planar with the first tray bottom;

a second peripheral wall joined substantially perpendicularly to and extending upwardly from the second tray bottom;

a second recess bottom joined to and extending upwardly from the second peripheral wall with the second recess bottom substantially perpendicular to the secondary wall;

a tertiary wall attached substantially perpendicularly to and extending downwardly from the second recess bottom, the tertiary wall substantially equal in length to the secondary wall;

a third tray bottom joined to the tertiary wall, with the third tray bottom substantially parallel and co-planar with the second tray bottom;

a third peripheral wall attached substantially perpendicular to and extending upwardly from the third tray bottom;

a third recess bottom joined to and extending from the third peripheral wall, with the third recess bottom substantially perpendicular to the tertiary wall; and a pair of spaced apart side walls joined to the primary, secondary and tertiary walls, first, second and third tray bottoms, first, second and third peripheral walls, and first, second and third recess bottoms.

* * * * *